US00RE40012E

(19) United States
(12) Reissued Patent
Patterson

(10) Patent Number: US RE40,012 E
(45) Date of Reissued Patent: Jan. 22, 2008

(54) ANTI-THEFT ALARM FOR PORTABLE COMPUTER

(75) Inventor: Jennifer S. Patterson, Minneapolis, MN (US)

(73) Assignee: J2D LLC, Crystal, MN (US)

(21) Appl. No.: 10/671,437

(22) Filed: Sep. 25, 2003

Related U.S. Patent Documents

Reissue of:
(64) Patent No.: 6,294,995
Issued: Sep. 25, 2001
Appl. No.: 09/522,812
Filed: Mar. 10, 2000

U.S. Applications:
(60) Provisional application No. 60/124,413, filed on Mar. 15, 1999.

(51) Int. Cl.
*G08B 13/14* (2006.01)

(52) U.S. Cl. ..... 340/571; 340/568.1; 340/686.1; 340/687; 704/273

(58) Field of Classification Search ..... 340/571, 340/568.1, 686.1, 687; 704/273
See application file for complete search history.

(56) References Cited

U.S. PATENT DOCUMENTS 4,686,514 A * 8/1987 Liptak, Jr. et al. ..... 340/571
4,812,841 A * 3/1989 Chen ..... 340/5.27
4,899,368 A * 2/1990 Krohn et al. ..... 379/28.11
5,034,723 A * 7/1991 Maman ..... 340/568.2
5,406,261 A * 4/1995 Glenn ..... 340/571
5,578,991 A * 11/1996 Scholder ..... 340/571
5,612,520 A * 3/1997 Toedtman et al. ..... 200/16 D
5,648,762 A * 7/1997 Ichimura et al. ..... 713/200
5,675,321 A * 10/1997 McBride ..... 340/568.2
5,757,271 A * 5/1998 Andrews ..... 340/568.1
5,757,616 A * 5/1998 May et al. ..... 361/683
5,760,690 A * 6/1998 French ..... 340/571
5,767,771 A * 6/1998 Lamont ..... 340/571
5,787,738 A * 8/1998 Brandt et al. ..... 70/58
5,805,066 A * 9/1998 Moody ..... 340/568.1
5,818,345 A * 10/1998 Sjööquist ..... 340/5.54
5,867,097 A * 2/1999 Jung et al. ..... 340/531
5,872,515 A * 2/1999 Ha et al. ..... 340/571
5,936,526 A * 8/1999 Klein ..... 340/571
5,963,131 A * 10/1999 D'Angelo et al. ..... 340/568.1
5,987,613 A * 11/1999 Busch et al. ..... 713/300
6,011,473 A * 1/2000 Klein ..... 340/571

* cited by examiner

*Primary Examiner*—Benjamin C. Lee
(74) *Attorney, Agent, or Firm*—Kinney & Lange, P.A.

(57) ABSTRACT

A laptop computer is supplied with special-purpose software that detects when the cover is being closed by an unauthorized person. When the cover is closed, an alarm sounds using the speaker integral the laptop. The closed-cover condition is detected. The software operates on either interrupt-driven devices or polled devices which have some means for detecting that the cover is closed. The software includes a password feature and a hot-key feature for overriding the alarm so that an authorized person may close the cover without disturbing other persons or to stop the alarm if the authorized person forgets to disable the alarm.

43 Claims, 4 Drawing Sheets

ANTI-THEFT ALARM FOR PORTABLE COMPUTER

Matter enclosed in heavy brackets [ ] appears in the original patent but forms no part of this reissue specification; matter printed in italics indicates the additions made by reissue.

This application claims priority to U.S. Provisional patent application Ser. No. 60/124,413 filed on Mar. 15, 1999 which is herein incorporated by reference.

A software method for causing the speaker of a portable computer to emit an audible alarm when the authorized user has set the alarm and some unauthorized person attempts to move or steal the portable computer and, in so doing, closes the cover of the portable computer.

FIELD OF THE INVENTION

The present invention relates to methods of preventing theft of portable computers. While no method or device can prevent all thefts, the present invention, because it is a software method of preventing a particular kind of common theft of personal computers, substantially increases the number of owners of portable computers who can enjoy a greater measure of protection from thefts.

Many thefts of small, valuable devices such as portable computers occur when a dishonest person seizes an opportunity. There is no master plan, no forethought. The thief sees an unguarded item, picks it up, tucks it under a coat or into a shopping bag, and disappears with it. Thieves of this sort depend on acting without being detected. The present invention, by causing an alarm to sound, will convince most thieves to bolt and run, leaving behind the portable computer.

Portable computers, as opposed to desktop computers, provide benefits to their users and owners in direct proportion to their small size. Technology has expanded to allow small laptops and notebooks and even smaller palm-sized or hand-held portable computers. The benefits of small size allow portable computers to be carried from place to place with a minimum of effort while taking up very little room in backpacks or briefcases.

Would-be thieves have not failed to notice the small size of portable computers. A computer small enough to fit into the briefcase, backpack or pocket of its owner can be hidden just as easily in the briefcase, pocket or bag of a thief.

Theft of portable computers is widespread and especially common in libraries at colleges and universities. Opportunity for theft is created when students ignore their portable computers for short time spans while they nap, turn away from their work to talk with friends, gaze over their shoulders to look out windows as they think or daydream, and drop pens or papers and bend down to retrieve them. Any place students spend time between classes studying, working on their portable computers, and talking with friends—for example, campus unions or nearby coffee houses—presents similar opportunities for theft.

BACKGROUND OF THE INVENTION

Presently available anti-theft devices range from physical devices such as chains and locks to motion detectors and remotely-triggered alarms as well as internal circuitry which causes an alarm to sound when the portable computer is moved. Others rely entirely on additional internal circuitry to cause an alarm to sound when the cover is closed on the portable computer.

Current anti-theft devices include the following: U.S. Pat. No. 5,757,271 to Andrews (1998)—a two-part motion detector, with one part internal and one part external; U.S. Pat. No. 5,760,690 to French (1998)—an internal motion detector; U.S. Pat. No. 5,648,762 to Ichimura (1997)—a "docking station" attached to a work surface into which the portable computer can be inserted and literally locked-down. U.S. Pat. No. 5,872,515 to Ha (1997) teaches a hardware means of causing an alarm to sound.

All of these devices are physical, hardware devices requiring either that the device be installed inside the computer case during manufacture or that the device be attached externally. The former method limits the protection to those who buy from particular manufacturers. The latter might prevent theft but also prevents the authorized user from carrying the computer from place to place. Since ease of transport and the ability to use the personal computer in many locations are among the primary reasons for owning a portable computer, anything that prevents the authorized user from transporting the portable computer decreases the usefulness of the portable computer.

A drawback of current internally installed anti-theft devices to manufacturers of portable computers is the extra expense of buying or making the hardware, and warehousing spares for repairs. Since the trend in portable computers is for them to be ever thinner and lighter, finding a place to put hardware without impeding heat-removal airflow is another drawback. A further drawback of the existing internal devices is that computers already manufactured cannot utilize the internal devices.

A major drawback of external chains and locks for portable computers is that the chains and locks must be carried along and attached at each place the portable computer is used. These devices provide no protection at all to the forgetful who leave them home or are in too much of a hurry to use them. Many such devices are not, themselves, portable since they must be screwed down or otherwise permanently fastened to some object not easily moved, such as a table.

SUMMARY OF THE INVENTION

The present invention teaches a software method for causing the speaker of a portable computer to emit an audible alarm whenever the authorized user has left the computer in a state with the alarm activated and speaker turned on and some unauthorized person attempts to move or steal the portable computer and, in doing so, closes the cover of the portable computer.

A thief wishes to avoid detection. In achieving this, the thief nearly always tries to conceal the object being stolen. In the case of a portable computer, concealment is enhanced by making the portable computer take up the least possible room. To minimize the size of the computer, the thief will nearly always close the cover on the computer. The invention takes advantage of the thief's closing the cover. When the thief closes that cover, the invention will cause an audible alarm thereby alerting the owner and bringing attention to the act of the thief. Most thieves will leave the computer alone and flee. The authorized user will be notified of the attempt to steal the computer. The theft should be prevented.

One of the advantages of the present invention is that it provides wider availability of protection against theft than do hardware-based alarms by permitting any portable computer user to install the software which is the disclosed invention. This will give a greater measure of anti-theft protection to those authorized users whose portable computers were not built with special, and relatively expensive, internal an circuitry.

Another advantage of the present invention is that an authorized user may select either to allow the speaker to emit an alarm at the maximum volume the speaker is capable of or to emit an alarm at a volume selected by the authorized user.

Another advantage of the present invention is that it permits an authorized user to select a password, a hot-key sequence, or both, whereby said authorized user may deactivate or activate the alarm feature.

Another advantage of the present invention is that it provides this wider level of protection whether a given portable computer employs an interrupt to initiate an instruction segment whenever the cover of said portable computer is foldably closed against the main body of said portable computer or if said portable computer must rely on a polling scheme for the same purpose.

Still another advantage of the present invention is that software is quite inexpensive to install. Changing the hardware internals can be quite expensive requiring various circuitry plus some quantity of labor to implement the circuitry. Installing new hardware can take substantial time. The present invention can be installed by the authorized user in a few minutes.

Yet another advantage is that the present invention, unlike the locks and chain used in some methods of preventing theft, will continue to permit the authorized user to transport said portable computer which is a major advantage and the reason for having portable computers.

DESCRIPTION OF FIGURES

FIG. 1 is in two parts.

SPECIFICATION

Figure 1A:
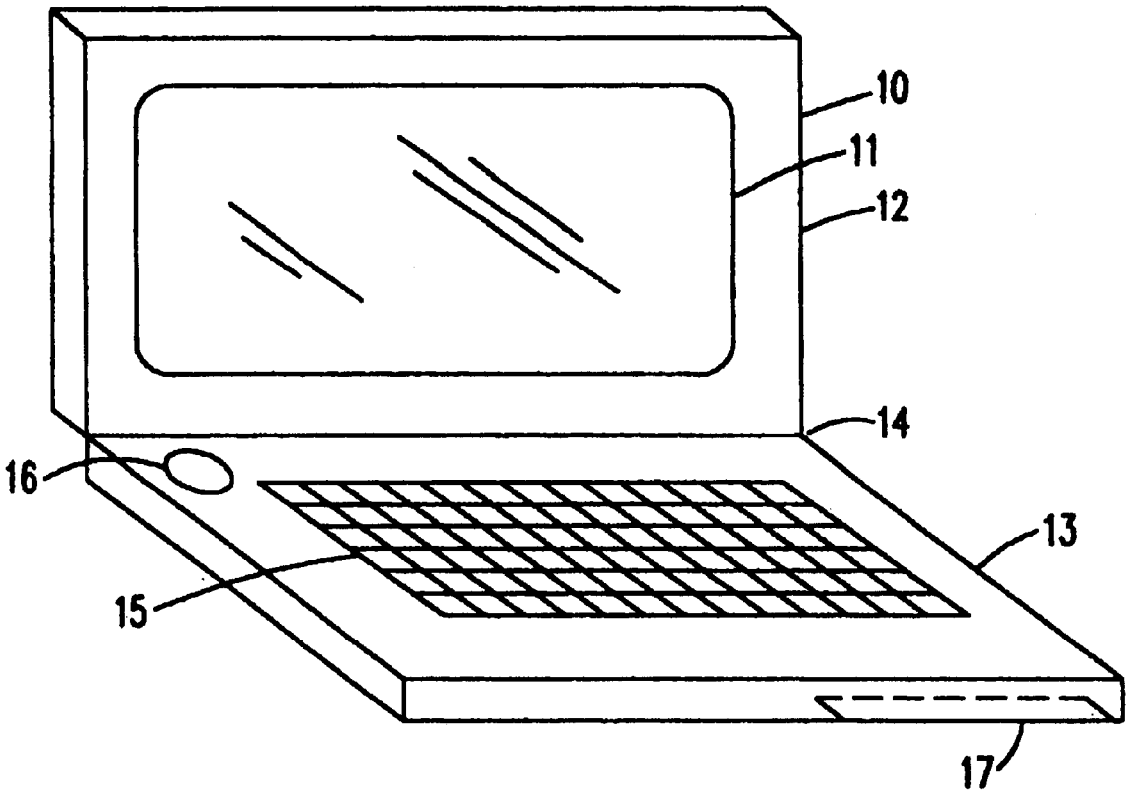
FIG. 1a shows a typical portable computer in an open position.

Portable computers contain nearly all of the major components of desktop and even larger computers. FIG. 1a, shows a portable computer 12 in the open position, meaning that the upper half, which forms the component we will call the "cover" 10, of the portable computer 12, is positioned at roughly a ninety-degree angle from the lower half or "main computer body" 13. Almost every computer must have some way of displaying information. In almost every portable computer this capability is provided by a display monitor 11 which is often an LCD or Liquid Crystal Display. This display monitor is, also almost universally, contained in the cover 10 of the portable computer 12.

The main computer body 13 of the portable computer contains much of the circuitry which will include the processor, memory, a mass storage device, and other circuitry. (Not shown.) On the outside of this main computer body lie the keyboard 15 for input and, usually, some form of pointing device, often called a "mouse" 16.

Figure 1B:
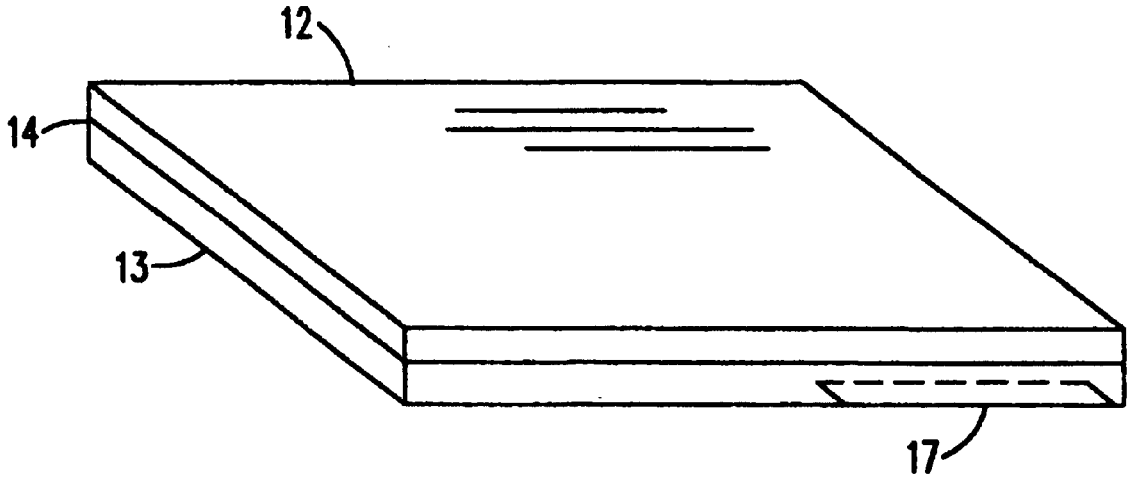
FIG. 1b shows the same typical portable computer in a closed position.

The cover and main computer body are connected by a hinge 14. This permits the cover and main computer body to be foldably dosed so the portable computer looks like a book, as in FIG. 1b.

One drawback of modern portable computers is that they consume a substantial amount of energy to run, substantial relative to the batteries that power them. Manufacturers strive to devise ways to extend battery life.

One common method to prolong battery life is to shut down the display when the cover is closed. This requires some way to detect if the cover has been foldably closed against the main computer body as in FIG. 1b. The detection is often made with a microswitch. The present invention is not limited to use of a microswitch. An electric eye or infrared sensor or any other means would suffice for purposes of the present invention. This invention is not concerned with the particular device or method used to detect that the cover is foldably closed against the main computer body nor is it concerned with the structure or architecture of the hardware components. It does not matter to the present invention whether the display is an LCD or a plasma screen or any other technology. The invention depends only that there be some way among the many possible ways to detect that the cover is foldably closed against the main computer body and that said detection causes some change in the portable computer's internal environment so that the software can react to that change.

Figure 2:
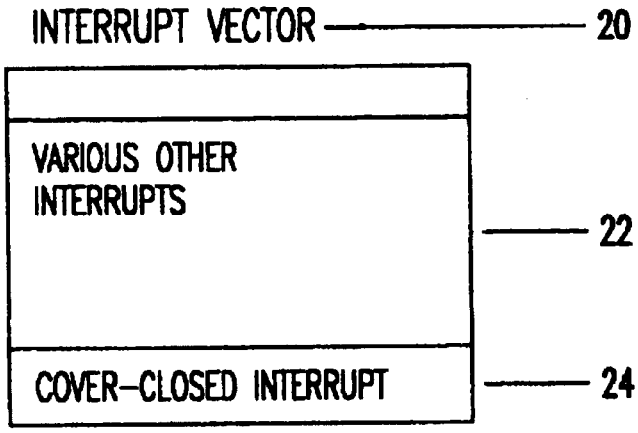
FIG. 2 shows a typical interrupt vector and a possible location within that interrupt vector for the interrupt that is initiated when the cover of the portable computer is closed.

It is well-known in the art to use a microswitch to detect if a cover of a portable computer is closed or open. It is also well-known in the computer art to make said microswitch send a signal to the portable computer's interrupt vector when a cover closes. FIG. 2.

An interrupt vector 20 is a portion of the processor or memory. It is a table of addresses to which control of the computer processor will be transferred upon occurrence of the particular interrupt Such addresses are sometimes called "pointers" or "indirect addresses". They are, in effect, addresses of other addresses. By various techniques well-known in the art, such pointers or indirect addresses can in turn point to other pointers or indirect addresses forming what is sometimes called a "cascade" of pointers or indirect addresses.

The number of levels of such a cascade can vary from one to any number depending on how the programmer writes the instructions. In the present invention, the term "indirect address" is used in the well-accepted sense of applying to cascades of any number of levels.

An interrupt is a cessation of processing and almost immediate transfer of control to the interrupt vector. A computer designer or component designer designs as many interrupts as the designer deems appropriate. Each condition that might cause an interrupt has its own location in the vector. The designer may design the processor so that the interrupt vector has the interrupt locations in any order the designer deems appropriate. Control of the processor is transferred to an address stored in the interrupt vector should that type of interrupt occur. The process of doing whatever the particular interrupt requires is called "interrupt handling".

The interrupt vector 20 contains numerous locations shown as 22 and 24. Whenever one of the interrupts occur, a computer stops what it is doing, saves the address of where the instruction was that the computer was executing when the interrupt occurs, reads the address in the location of the interrupt vector corresponding to the particular interrupt 22, then transfers control of the computer to the instruction segment at the address corresponding to that address in the interrupt vector.

In FIG. 2, the interrupt vector 20 is shown with an undefined number of interrupts plus one interrupt for directing the computer to handle the cover-closed interrupt 24. The figure is for illustrative purposes only. The closed-cover interrupt location will be in whatever location in the vector the designer gave that interrupt. The layout of the interrupt vector is a design consideration which has no effect on the present invention.

A computer program can, through various techniques well-known in the art, alter an address in the interrupt vector 20. In its simplest form, this process, known as "trapping an interrupt", is accomplished by replacing the address in the interrupt vector 20 for a particular interrupt with the address of an instruction that a programmer wishes the computer to execute instead.

Figure 3:
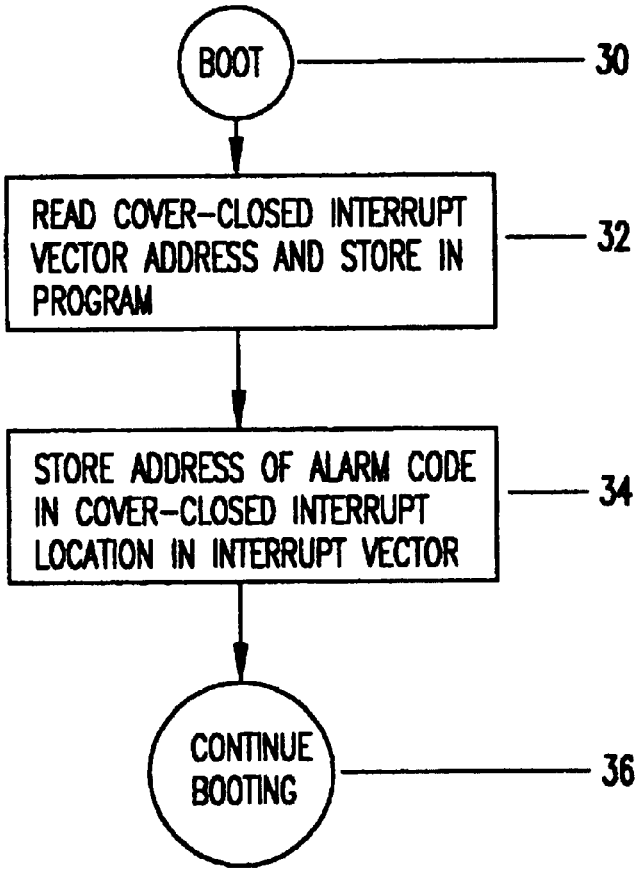
FIG. 3 is a flowchart of a portion of the initialization or "boot" process for the portable computer. This portion shows the flow of control during the trapping of the closed-cover interrupt address.

Trapping is normally accomplished during the system start or "boot" process. It does not matter whether it is a cold boot—meaning starting with the portable computer shut off—or a warm boot—meaning starting with the portable computer running. The trapping is the same. FIG. 3.

Figure 4:
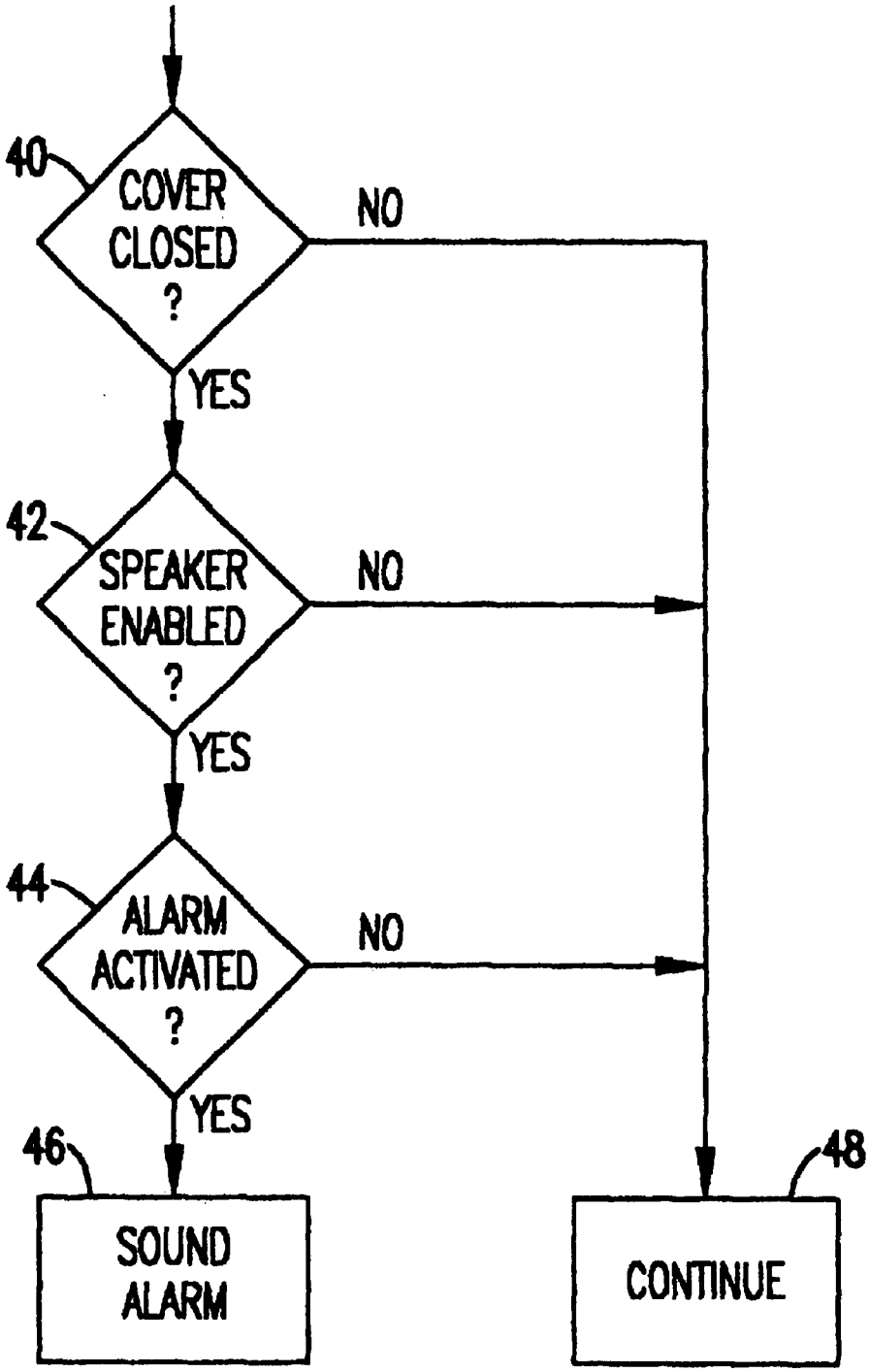
FIG. 4 is a flowchart of the instruction segment that is executed when closing the cover triggers the interrupt. Flow of control goes to the starting address of the instruction segment which is the present invention. If the alarm is not enabled by the operating system or if the authorized user has disabled the alarm, no alarm will sound.

Considering both FIG. 2, FIG. 3, and FIG. 4, the boot process 30 executes a portion of the instruction segment which is the present invention. The instruction segment reads 32 the address in the cover-closed interrupt location 24. Next, at 32, the instruction segment stores the address just read from the cover-closed interrupt location 24 and saves that address into the instruction segment which processes the interrupt. In FIG. 4, this address would be saved in the location for the instruction segment at 48.

Next, the boot process segment 30 stores the starting address of the instruction segment which processes the cover-dosed interrupt 40 in the closed-cover interrupt location 24.

Thus, when the closed-cover interrupt occurs, control passes to the instruction segment shown in FIG. 4.

Once the trapping has been completed, the boot process continues 36.

FIG. 4 shows what happens after a closed-cover interrupt As noted, control passes to the starting address of the instruction segment 40 shown in FIG. 4. The figure shows a check to detect if the cover is closed 40. This step may be redundant but may be retained as a second check to make certain that the interrupt is valid.

If the cover is closed 40, control passes to the next instruction segment If the cover is not closed, control passes to the step shown at 48. As part of the boot process, the instruction segment at 48 was changed to contain the address of the interrupt handler that would have been executed but for the changes made by the present invention. Usually, this is an instruction segment intended to power down or decrease power to the display. This power down or power decrease function is not part of the present invention.

If control reaches 42, the instruction segment checks to see if the speaker is enabled This is usually a function of the operating system. It is common for an operating system to permit a user to turn the speaker off or to turn down the volume on that speaker. If the speaker is not enabled, control passes to 48, described above. If the speaker is enabled, control passes to 44.

At 44, the instruction segment checks to see if the alarm is activated. The authorized user has a number of options for activating and deactivating the alarm. These options permit the authorized user to turn off the alarm so that, for example, the authorized user may shut the cover on the authorized user's own portable computer without causing an alarm to sound. If the alarm has been deactivated, control passes to 48 as described above.

If the alarm is activated 44, control passes to the instruction segment that causes the speaker to emit the alarm 46.

Figure 5:
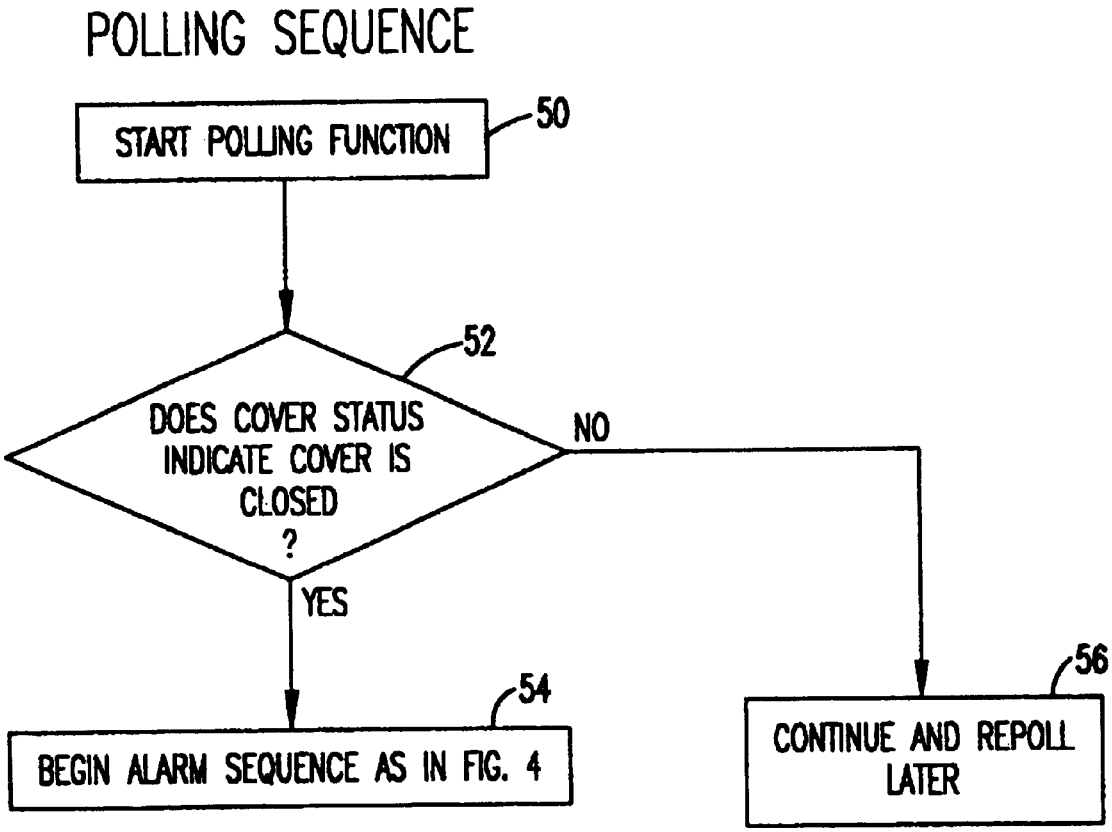
FIG. 5 is a flowchart of an alternative method of implementing the present invention. Here, an alarm instruction process is initiated not by an interrupt but by a background program that checks at intervals whether the cover is closed as indicated by a status location within the portable computer. If the cover is closed and the alarm is not enabled by the operating system or the authorized user has disabled the alarm, no alarm will sound.

FIG. 5 describes an alternate method. Not all portable computers contain an interrupt triggered when the cover is foldably closed against the main computer body. Portable computers without a closed-cover interrupt still must detect if the cover is foldably closed against the main computer body because the need to preserve battery life is a universal concern for portable computer designers.

One common method is to have the detecting device, which may be a microswitch or other device, change the condition of a register or status indicator location in memory or the processor. In order to begin the power down process, the operating system polls said register or status indicator. This means that some instruction segment tests the register or status indicator to detect if the register or status indicator indicates the cover is closed. Said instruction segment may be part of the operating system or it may be an instruction segment that is started and executed on a regular or irregular basis.

In the polling case, there is no need to implement a boot process instruction segment since polling does not depend on interrupts. However, the polling program must be started during initialization or manually be the authorized user.

The polling sequence begins at 50. The instruction segment reads the register or status indicator 52 then tests the contents thereof to detect if the register or status indicator indicates the cover is foldably closed against the main computer body. If the register or status indicator does not indicate the cover is foldably closed against the rain computer body, control passes to 56. At 56, control passes to whatever instruction segment would have been executed but for the polling segment's executing. If the register or status indicator does indicate the cover is foldably closed against the main computer body, the present invention passes control to 40 as shown in FIG. 4, described previously. From there, execution is the same as in the method of indicating a cover-closed condition triggered by the interrupt.

The preferred embodiment of the present invention contains a variety of features as set out in the claims. The present invention is implemented on any personal computer which contains any method for detecting that the cover is foldably closed against the main computer body. The present invention is installed as a software program on any of said portable computers.

The preferred method begins during the boot process, the process of initializing a portable or other computer, loading the operating system, loading programs, and any other tasks that are executed when said portable or other computer is started from a power off situation, called a cold boot, or restarted from a power on situation, called a warm boot.

The preferred embodiment of the present invention operates during a cold or a warm boot. The type of boot has no effect on the operation of the method.

During the boot process, the cover-closed interrupt is trapped so that, upon triggering of a closed-cover interrupt, control will transfer to the start of the instruction segment which represents the present invention.

The present invention will cause a speaker in said portable computer to emit a sound which serves as an alarm. In the preferred embodiment, the authorized user may set the volume of said speaker to its maximum or the authorized user may select some other volume or sound. In the preferred embodiment, the authorized user may also select a password for deactivating the program segment, specifically said program segment which causes said speaker to emit said alarm. The authorized user may also select passwords or hot-key sequences or both, said passwords being used for activating or deactivating the instruction segment, specifically, said program segment which causes said speaker to emit said alarm. The password for activating the instruction segment may be different from the password for deactivating the program segment. The hot-key sequence for activating the instruction segment may be different from the hot-key sequence for deactivating the instruction segment. The authorized user may activate the program segment with a password and deactivate the program segment with a hot-key sequence or vice-versa.

An alternative embodiment differs from the above-described embodiment only in that this alternative embodiment allows the present invention to be implemented on a portable computer which does not employ an interrupt to indicate said cover is foldably dosed against said main computer body. In the alternative embodiment, the present invention polls the register or status location which is changed when the cover is foldably closed against the main computer body. In said alternative embodiment there is no interrupt trapping so, in this embodiment, there is nothing to be done at boot time. The program segment must be started by the operating system or the authorized user.

What is claimed is:

1. A method for causing a speaker to sound an audible alarm in a portable computer having a cover, a main computer body, a hinge between said cover and said body, and an interrupt vector, said method comprising:

a) detecting foldable closing of said cover relative to said body;

b) causing an interrupt to occur within said portable computer;

c) said interrupt causing branching control to a fixed address in said interrupt vector following said detecting; and d) generating said audible alarm from said speaker following said interrupt;

and further comprising; detecting whether said speaker is enabled; and detecting whether said alarm is activated by an authorized user.

2. The method according to claim 1, wherein a computer designer assigns said fixed address in said interrupt vector for interrupt handling said interrupt upon detection of said foldable closing of said cover to said body.

3. The method according to claim 2, said fixed address in said interrupt vector comprising an original address for branching control of said portable computer upon occurrence of said interrupt upon detection of said foldable closing of said cover to said body.

4. The method according to claim 3, further comprising a first instruction segment at said original address contained in said fixed address in said interrupt vector, control branching to said instruction segment of said portable computer upon detecting said foldable closing of said cover to said body.

5. The method according to claim 4, further comprising a second instruction segment.

6. The method according to claim 5 wherein said second instruction segment is located at a second address.

7. The method according to claim 6, wherein said second instruction segment causes said speaker to generate said audible alarm.

8. The method according to claim 7, further comprising trapping said interrupt caused by said foldable closing of said cover of said portable computer.

9. The method according to claim 8, wherein said trapping occurs at boot time.

10. The method according to claim 9, wherein said interrupt is trapped by resetting said original address in said interrupt vector to an indirect address of said second address of said second instruction segment.

11. The method according to claim 10, wherein said detecting of said foldable closing of said cover occurs subsequent to boot time.

12. The method according to claim 11, wherein a volume for said alarm is set by said authorized user.

13. The method according to claim 12, wherein said authorized user may deactivate said alarm.

14. The method according to claim 13, wherein said authorized user may select one of a plurality of passwords for deactivating said alarm.

15. The method according to claim 13, wherein said authorized user may select one of a plurality of hot-keys for deactivating said alarm.

16. The method according to claim 12, wherein said authorized user may activate said alarm.

17. The method according to claim 16, wherein said authorized user may select one of a plurality of passwords for activating said alarm.

18. The method according to claim 16, wherein said authorized user may select one of a plurality of hot-keys for activating said alarm.

19. A method for causing a speaker to sound an audible alarm in a portable computer having a cover, a main computer body, a hinge between said cover and said main computer body, a status location indicating foldable closing of said cover against said body, and an instruction segment, said method comprising:

a) polling said status location to detect said foldable closing of said cover against said main computer body;

b) causing execution of said instruction segment following detection of said status location indicating said foldable closing of said cover against said main computer body;

c) said instruction segment generating said audible alarm;

and further comprising: detecting whether said speaker is enabled; and detecting whether said alarm is activated by an authorized user.

20. The method according to claim 19, wherein a volume for said alarm is set by said authorized user.

21. The method according to claim 20, wherein said authorized user may deactivate said alarm.

22. The method according to claim 21, wherein said authorized user may select one of a plurality of passwords for deactivating said alarm.

23. The method according to claim 21, wherein said authorized user may select one of a plurality of hot-keys for deactivating said alarm.

24. The method according to claim 20, wherein said authorized user may activate said alarm.

25. The method according to claim 24, wherein said authorized user may select one of a plurality of passwords for activating said alarm.

26. The method according to claim 24, wherein said authorized user may select one of a plurality of hot-keys for activating said alarm.

*27. A method for causing a speaker to sound an audible alarm in a portable computer having a cover, a main computer body, a hinge between said cover and said body, the method comprising:*

*detecting foldable closing of the cover relative to the main computer body of the portable computer;*

*detecting whether the speaker is enabled;*

*detecting whether an alarm instruction is activated; and*

*generating the audible alarm from the speaker if the alarm instruction is activated, the speaker is enabled, and a foldable closing is detected.*

*28. The method of claim 27 wherein the step of detecting foldable closing comprises:*

*trapping a interrupt associated with a closed position of the cover relative to the main computer body; and*

*activating the alarm instruction when the cover is closed.*

*29. The method of claim 27 wherein the step of detecting foldable closing comprises:*

*causing an interrupt to occur within the portable computer when the cover is closed; and*

*causing branching control based on the interrupt to a fixed address in said interrupt vector.*

*30. The method of claim 27 wherein the step of detecting foldable closing comprises:*

*triggering a microswitch while the cover is foldably closing; and*

*executing the alarm based on a signal from the microswitch.*

*31. The method of claim 27, wherein before the step of detecting foldable closing, the method further comprising:*

*executing a portion of the alarm instruction during a boot process of the portable computer.*

*32. The method of claim 27 wherein the step of detecting foldable closing comprises:*

*polling a status indicator associated with the foldable closing of the cover; and*

*executing an instruction segment when the status indicator is true.*

*33. The method of claim 27 wherein a volume for the audible alarm is set by an authorized user.*

*34. The method of claim 27 wherein an authorized user may deactivate the audible alarm.*

*35. The method of claim 27 wherein an authorized user may deactivate the alarm instruction.*

*36. The method of claim 34 wherein the authorized user uses a password to deactivate the audible alarm.*

*37. The method according to claim 34 wherein the authorized user uses one or more hot-keys to deactivate the audible alarm.*

*38. The method according to claim 27 wherein before detecting foldable closing, the method further comprising:*

*executing an instruction segment according to an action taken by an authorized user, the instruction segment for activating the alarm instruction.*

*39. A method for causing a speaker to sound an audible alarm in a portable computer having a cover, a main computer body, a hinge between the cover and the main computer body, the method comprising:*

*executing an alarm instruction for monitoring a position status of the cover relative to the main computer body;*

*detecting an unauthorized closing of the cover;*

*detecting whether the speaker is enabled;*

*detecting whether the alarm is activated; and*

*generating an audible alarm programmatically if the speaker is enabled, the alarm is activated, and an unauthorized closing of the cover is detected.*

*40. The method of claim 39 wherein the step of detecting an unauthorized closing of the cover comprises:*

*trapping a cover-closed interrupt; and*

*triggering an alarm sequence when the status of the cover-closed interrupt changes.*

*41. The method of claim 39 wherein the step of executing the alarm instruction comprises:*

*executing a portion of the alarm instruction segment with a boot process of the portable computer.*

*42. The method of claim 39 wherein the step of executing the alarm instruction comprises:*

*executing automatically the alarm instruction segment with the operating system of the portable computer.*

*43. The method of claim 39 wherein the step of executing the alarm instruction comprises:*

*executing the alarm instruction segment by an action of an authorized user.*

* * * * *